(12) United States Patent
Tjalldin et al.

(10) Patent No.: US 6,768,896 B2
(45) Date of Patent: Jul. 27, 2004

(54) WIRELESS SYSTEMS INTERNET GATEWAY

(75) Inventors: Birger Tjalldin, Taby (SE); Ulf Soderberg, Taby (SE)

(73) Assignee: Possio AB, Taby (SE)

( * ) Notice: Subject to any disclaimer, the term of this patent is extended or adjusted under 35 U.S.C. 154(b) by 530 days.

(21) Appl. No.: 09/753,657

(22) Filed: Jan. 4, 2001

(65) Prior Publication Data

US 2002/0037741 A1 Mar. 28, 2002

(30) Foreign Application Priority Data

Sep. 25, 2000 (SE) .............................................. 0003417

(51) Int. Cl.$^7$ ................................................ H04B 7/15
(52) U.S. Cl. ........................ 455/11.1; 455/412; 370/401
(58) Field of Search .............................. 455/11.1, 41.1, 455/41.2, 41.3, 552.1, 553.1, 426.1, 426.2; 370/338, 401

(56) References Cited

U.S. PATENT DOCUMENTS

| 5,968,123 | A | 10/1999 | Fujiwara et al. | |
| 6,584,146 | B2 * | 6/2003 | Bose et al. | 375/219 |
| 2001/0030950 | A1 * | 10/2001 | Chen et al. | 370/329 |

FOREIGN PATENT DOCUMENTS

| EP | 0 300 350 | 1/1989 |
| WO | 97/01940 | 1/1997 |
| WO | 99/33226 | 7/1999 |
| WO | 01/03392 A1 | 1/2001 |

* cited by examiner

*Primary Examiner*—Lee Nguyen
(74) *Attorney, Agent, or Firm*—Young & Thompson

(57) ABSTRACT

In a portable gateway a bridge between two wireless networks is provided. The gateway has a small size and can be carried in a pocket or a briefcase.

18 Claims, 1 Drawing Sheet

(Fig. 1-3)

WIRELESS SYSTEMS INTERNET GATEWAY

TECHNICAL FIELD

The present invention relates to a gateway, and in particular to a gateway designed to constitute a bridge between two wireless networks.

BACKGROUND OF THE INVENTION AND PRIOR ART

Today many types of different wireless networks exist. The different networks usually use different radio frequency transmission methods, and communication protocols. Thus, when information is to be transmitted over two different networks from a transmitter to a receiver, the information must in most cases be translated from a first format into a second format when the information is passed from the first network to the second network. Such a translation is usually performed by a so called gateway. Hence, the gateway constitutes a bridge between the two different networks.

SUMMARY

It is an object of the present invention to provide a new type of gateway enabling many new mobile applications, and that will enhance other applications, by providing a bridge between different wireless communications environments.

This object and others are obtained by a portable gateway providing a bridge between two wireless networks, and, in particular, a portable gateway designed to bridge between a Bluetooth network and a Wireless Local Area Network (WLAN).

In a preferred embodiment the portable gateway has at least one and preferably two slots for receiving a PC Card or a CompactFlash Card. By means of selecting suitable PC Cards the portable gateway can bridge between any wireless networks.

Also, the gateway preferably comprises an embedded server for distributing parameters relating to the different networks, such as network names, user name and password and also other parameters regarding for example security. The server is accessed from a remote input wireless terminal, such as mobile telephone.

The new applications, and the other applications, will, in particular, include devices such as mobile phones, Personal Digital Assistants (PDA's), or other mobile devices, equipped with Wireless Application Protocol (WAP) and means for Bluetooth connectivity.

For these, and other devices, the gateway as described herein will enable new mobile Internet applications, in particular such applications requiring transmission speeds in the range of about 100 kbit/s to 1 Mbit/s. Also, future applications will involve even higher transmission speeds.

These, and other, mobile applications are enabled by using one wireless network, such as Bluetooth, as the carrier for the Internet access of the device by communicating to the gateway, which is, in turn accessing the Internet, by another wireless network, e.g. by means of a WLAN.

BRIEF DESCRIPTION OF THE DRAWINGS

The present invention will now be described in more detail and with reference to the accompanying drawings, in which.

DESCRIPTION OF PREFERRED EMBODIMENTS

Figure 1:
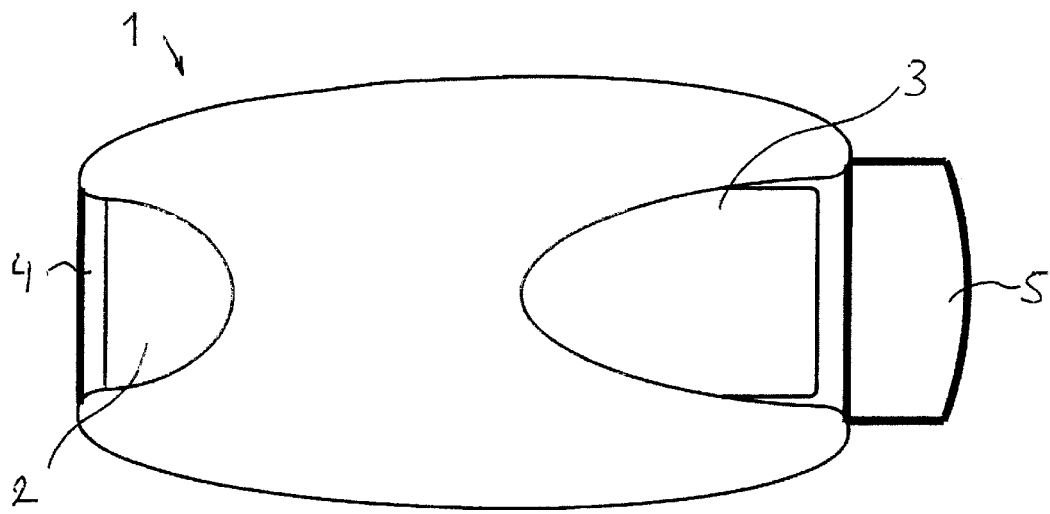
FIG. 1 is a view from above of a gateway.

In FIG. 1, a view from above of a portable gateway 1 is shown. The gateway 1 comprises two slots 2 and 3 for receiving a PC Card (CompactFlash) 4 and a PC Card (PCMCIA) 5 each. The card slots are located on two different sides facing each other, and the gateway preferably has an elongated shape. The size of the gateway 1 is preferably large enough for encompassing the cards, but small enough to fit inside a pocket or a small briefcase. In a preferred embodiment is designed as a thin essentially rectangular unit having the measures of only 142×78×28 mm.

Figure 2:
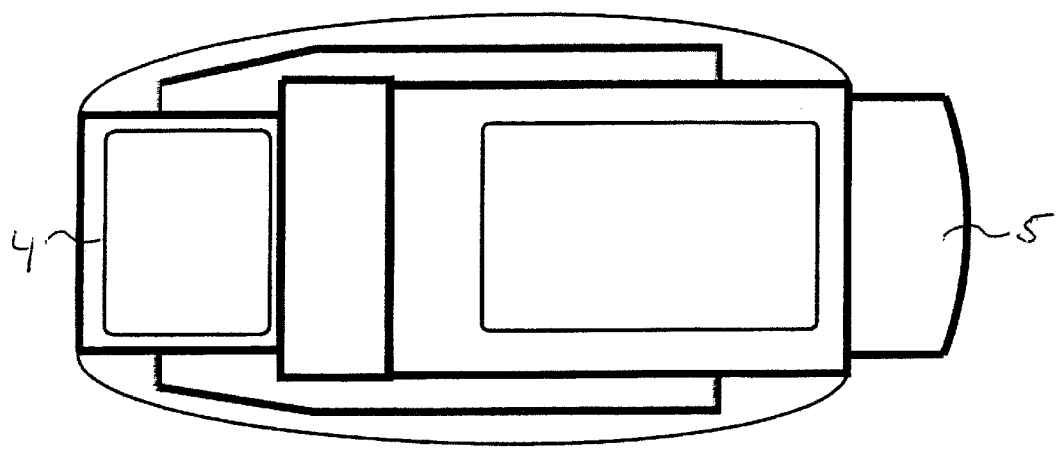
FIG. 2 is view of the gateway in FIG. 1, with its cover removed.
Figure 3:
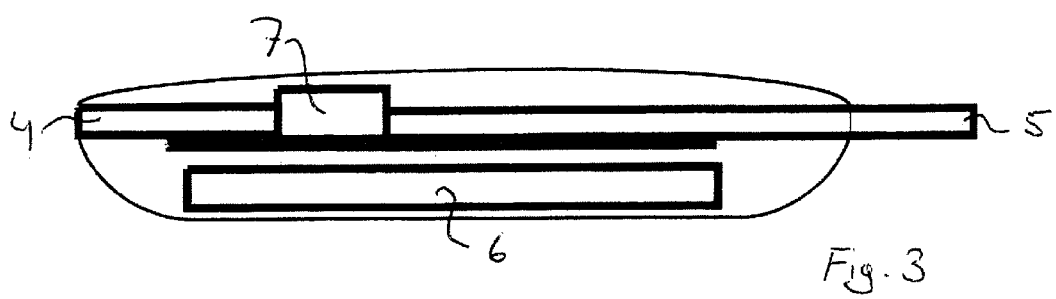
FIG. 3 is a cross section of the gateway in FIGS. 1 and 2.

In FIG. 2, the gateway 1 is shown with its cover removed. Further, the gateway comprises a battery 6 and a control unit 7, as is seen in FIG. 3.

The first PC Card 4 provides an interface towards a first wireless network, for example a Bluetooth network, and the second PC Card 5 provides an interface towards a second wireless network, for example a WLAN or a GSM/GPRS or a UMTS network. The slots 2 and 3 can be designed to receive PC Cards, CompactFlash Cards, or other types of input or output cards.

In another preferred embodiment the interface towards the wireless networks are integrated in the portable gateway 1. Thus, the gateway may have only one or no slot for receiving a PC Card. Thus, if the gateway is designed to always be connected to a Bluetooth network and that the other wireless network, which the gateway is to form a bridge to can differ, or will have some special requirements, i.e. a smart card with a subscription identification module, SIM, or any special security application, the gateway can have an integrated Bluetooth interface and only one PC Card slot.

In a similar way, if the portable gateway is designed to always bridge between two different wireless networks the interfaces towards both wireless networks may be integrated in the portable gateway. In such an embodiment the portable gateway can be designed without any PC Card slots. In particular the portable gateway can be designed to form a bridge between a Bluetooth network and a Wireless Local Access Network (WLAN).

The gateway can also comprise an embedded server (not shown) for distributing parameters relating to the different networks, such as network names, user name and pass word the different and also other parameters regarding for example security. The server is accessed from a remote input wireless terminal, such as mobile telephone.

For portable gateways between two wireless systems, there can in some circumstances be an undesired interference between the signals from the two antennas, being used for access to the two wireless networks.

This can be the case if the two antennas are mounted in close proximity, e.g. if the gateway is designed using two PC Cards with integrated, or extending, antennas, and one card is placed on top of the other. Thus, by locating the PC Cards, in the case when two PC Cards are used, with the antennas on opposite sides of the portable gateway, with a maximum distance apart, is advantageous.

In the preferred embodiment of a gateway shown in FIG. 1, using two PC Cards, this is achieved by designing the slots in one plane, but with their entry slots maximally separated, resulting in a maximum distance between the antennas for the accesses to the two wireless networks.

This can also be the case, if the gateway is designed for one PC Card for access to one of the wireless networks, with an integrated or extending antenna, and the antenna of the gateway for access to the wireless network, are not being placed on opposite sides of the portable gateway.

Likewise, in the case when one, or no, PC card is used, it is advantageous to position the antennas on opposite sides of the portable gateway, with a maximum distance apart.

Using the device as described herein will provide a wireless access method to the Internet for cellular phones (or PDA's), which is fast, and can be charged at flat rate.

By providing this alternative method of Internet access, the device as described herein will enhance many new applications, such as WAP (over Bluetooth, including voice/audio), enable Music (MPEG-3), streaming Video and Image telephony (MPEG-4), in mobile phones (or PDA's), and many other Internet applications requiring 0.5–1 Mbit/s.

What is claimed is:

1. A gateway for providing a bridge between two different wireless networks, comprising:
   a housing;
   a battery, located within the housing, the battery serving as a primary power source rendering the gateway portable;
   a bridge, located within the housing, the bridge serving to bridge between two wireless networks;
   two different antennas for providing an air-interface between the bridge and the two respective wireless networks;
   a first wireless communications unit associated with a first of the two antennas for communicating between a first of the two wireless networks and the bridge, the first wireless communications unit being located at least partly within the housing;
   a first expansion card slot in registration with an opening in the housing and receiving the first wireless communication unit;
   a second wireless communications unit for communicating between a second of the two wireless networks and the bridge, the second wireless communications unit being at least partly within the housing.

2. A gateway according to claim 1, characterized in that the antennas are positioned on opposite sides of the housing, thereby spacing the two antennas apart maximally.

3. A gateway according to claim 2, further comprising a second card slot for receiving the second wireless communications unit.

4. gateway according to claim 3, wherein the first and second card slots are coplanar.

5. A gateway according to claim 4, characterized in that the two card slot entries, are placed on different sides of the gateway along a longest length of the gateway.

6. A gateway according to claim 3, wherein,
   the one of the two antennas is an integrated antenna, and
   the first expansion card slot, is separated from the integrated antenna, thereby separating the integrated antenna and the antenna of the card maximally apart.

7. A gateway according to claim 3, characterized in that the first expansion card slot is designed to receive a CompactFlash Card.

8. A gateway according to claim 1 characterized in that one of the two wireless networks is a cellular wireless network.

9. A gateway according to claim 8, characterized in that the cellular network is a GSM (Global System for Mobile communication), or a GPRS (General Packet Radio Service), or a UMTS (Universal Mobile Telecommunications System) network.

10. A gateway according to claim 1, characterized in that one of the wireless networks is a Bluetooth network.

11. A gateway according to claim 1, characterized in that the gateway comprises an embedded server for configuring of parameters relating to the different networks.

12. A portable gateway, comprising:
    a gateway housing;
    a first expansion slot within the housing for receiving a first expansion card comprising a first wireless communications interface to a first wireless network;
    a second wireless communications interface to a second wireless network;
    a bridge connecting the first and second wireless communications interfaces;
    a battery providing power to the first and second wireless communications interfaces and to the bridge to render the gateway portable; and
    first and second antennas located at opposite ends of the housing and associated respectively with the first and second wireless communications interfaces.

13. The gateway of claim 12, wherein the first expansion card is one of a CompactFlash card and a Secure Digital card.

14. The gateway of claim 13, further comprising:
    a second expansion slot within the housing,
    the second expansion slot being coplanar with the first expansion slot,
    the second expansion slot receiving the second wireless communications interface,
    the first and second antennas being located external to the housing.

15. The gateway of claim 14, wherein,
    the housing has an elongated shape, and
    the first and second expansion slots are located, in alignment along a longest length of the housing, at opposite ends of the housing.

16. The gateway of claim 12, wherein the second wireless communications interface an integrated interface permanently mounted within the housing.

17. The gateway of claim 12, wherein the first wireless communications interface is selectively selected from a set of wireless communications interfaces to provide connectivity to a selected one of plural types of wireless networks.

18. A portable gateway, comprising:
    a gateway housing;
    a first expansion slot within the housing for receiving a first expansion card comprising a first wireless communications interface to a first wireless network;
    a second expansion slot within the housing for receiving a second wireless communications interface to a second wireless network;
    a bridge connecting the first and second wireless communications interfaces;
    a battery providing power to the first and second wireless communications interfaces and to the bridge to render the gateway portable; and first and second antennas located at opposite ends of the housing and associated respectively with the first and second wireless communications interfaces, the first and second antennas being external to the housing, the first and second expansion slots being coplanar and opposite ends of the housing along a longest length of the housing.

* * * * *